Sept. 24, 1963                C. R. NALLE                3,104,493
                        FURNITURE SUPPORT ELEMENT
Filed June 18, 1962                              2 Sheets-Sheet 1

INVENTOR.
CHARLES R. NALLE
BY Howson & Howson
ATTYS.

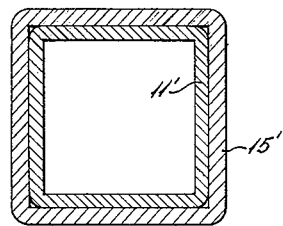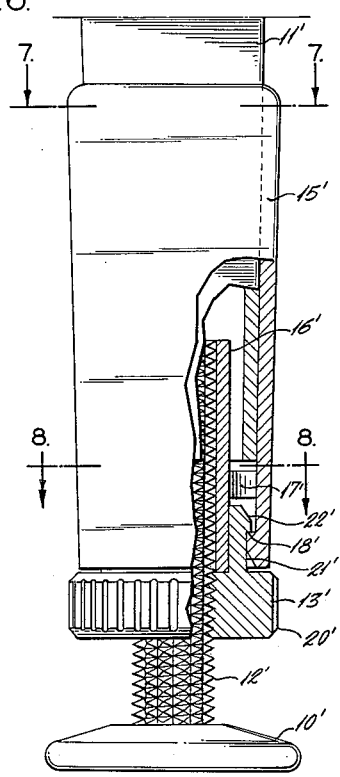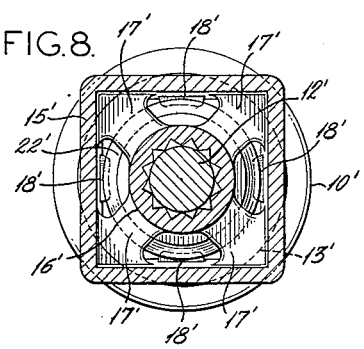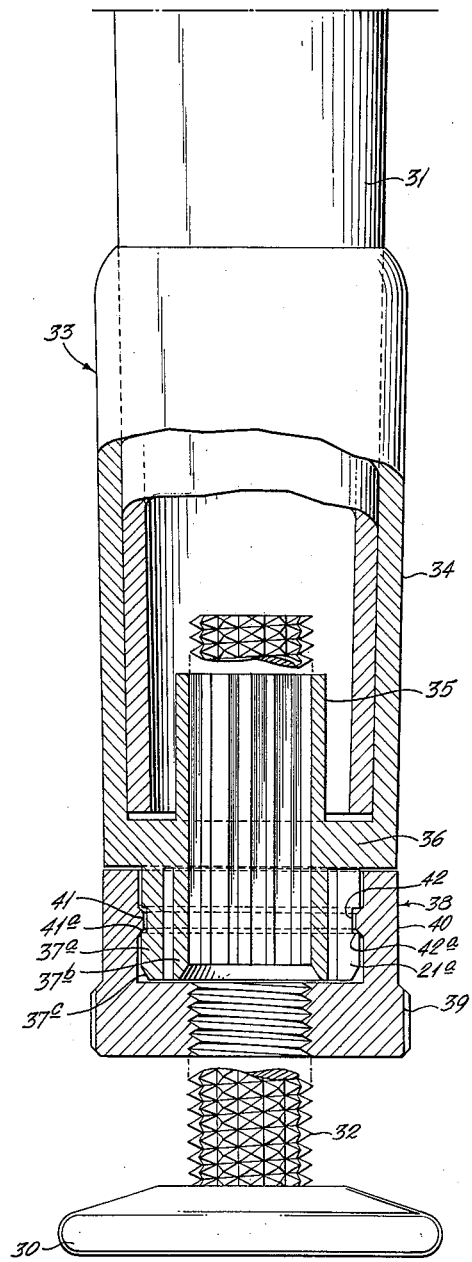

United States Patent Office 3,104,493
Patented Sept. 24, 1963

3,104,493
FURNITURE SUPPORT ELEMENT
Charles R. Nalle, 1810 Rittenhouse Square,
Philadelphia, Pa.
Filed June 18, 1962, Ser. No. 203,321
12 Claims. (Cl. 45—139)

This invention relates to a furniture support element for use with a tubular furniture leg, which furniture support element is adapted to receive an axially splined and threaded shank of a floor contacting member such as a glide, caster or similar device.

Various means have been devised for applying furniture support elements, such as casters, to tubular legs but in many instances support elements of this type are incapable of being adjusted to and maintaining any desired height within a predetermined range. Moreover the appearance of support elements is often ugly, projecting well beyond the leg in an unsightly way. The projecting parts may, in fact, be in the user's way and scrape shoes or snag stockings.

A considerable amount of furniture, and certain commercial and school equipment, for example, cabinets, tables, stands and the like, have been made with small diameter tubular legs. Additionally, radio, phonograph and television stands or tables for the home are frequently made of such tubing. Most of these legs are made from straight tubing of various cross sectional shapes or tubing which is tapered by swaging.

I have devised casters in various forms which are capable of maintaining a desired height after adjustment, but such devices have not been useful with small diameter metal tubing structures commonly used today. In accordance with the present invention, I have improved my previous caster so that it is useful with tubular legs.

The present invention is directed to a ferrule construction which employs the caster arrangement of my previous invention and makes it possible to achieve precise height adjustment easily and to maintain that adjustment once it is achieved. The present invention is also capable of presenting a smooth, finished exterior appearance and at the same time firmly and snugly supporting the leg.

More specifically, the device of the present invention consists of a tubular ferrule having an inner surface conforming essentially to the surface of the outer diameter of the furniture leg with which it is to be used. A tube inside and toward the bottom of the ferrule having an outer diameter smaller than the inner diameter of the furniture leg is provided with a ribbed inner surface, the ribs being arranged to engage the splines of the shank of the floor contacting member. Connecting the ferrule and the tubular member are support ribs which extend generally radially inwardly. A second piece is a rotatable internally threaded nut having an outer diameter greater than the inner diameter of the ferrule. The threads of the nut are arranged to engage the threads of the shank of the floor contacting member. A collar on the nut extends above the nut and is provided with a radially extending shoulder spaced above the nut. A shoulder is also provided on the first piece in position to oppose the shoulder on the second piece when the two are fixed in position. At least one of the shoulder supporting means must be resiliently supported to permit radial yielding of its shoulder so that the shoulders may be moved axially past the other member in assembly of the first piece relative to the second piece.

A preferred embodiment provides shoulders at the bottom of the ferrule which are inwardly extending and a collar on the nut which slides inside these shoulders and which itself is provided with a shoulder which overlaps the shoulder on the ferrule. The shoulders on the ferrule are spaced below the radially extending member which connects the ferrule and the inner tubular member.

For a better understanding of the present invention, reference is made to the drawings, in which FIG. 1 is an elevational view partially in vertical section showing the structure of the present invention;

FIG. 6 is an elevational view similar to FIG. 1, showing a modified structure for use with square tubing;

FIG. 7 is a sectional view taken on line 7—7 of FIG. 6;

FIG. 8 is a sectional view taken on line 8—8 of FIG. 7; and

FIG. 9 is an enlarged elevational view similar to FIG. 1 showing still another modified structure.

Figure 1:
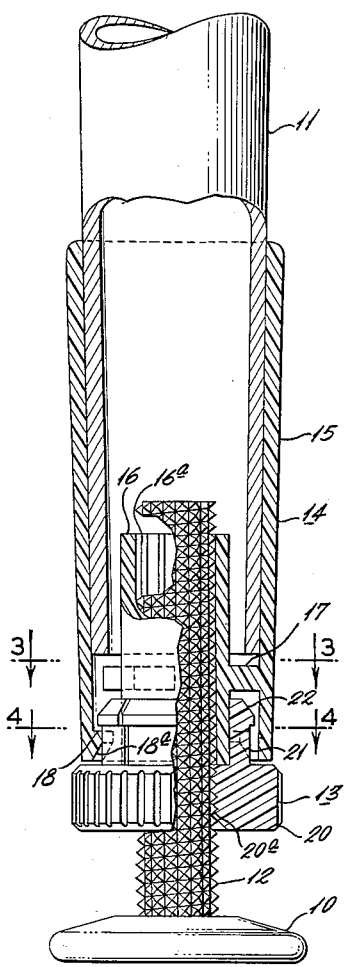
Figure 3:
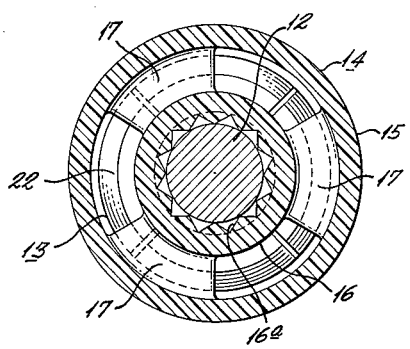
FIG. 3 is a sectional view taken on line 3—3 of FIG. 1.
Figure 4:
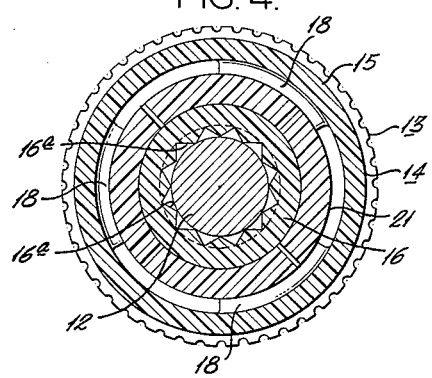
FIG. 4 is a sectional view taken on line 4—4 of FIG. 1.
Figure 2:
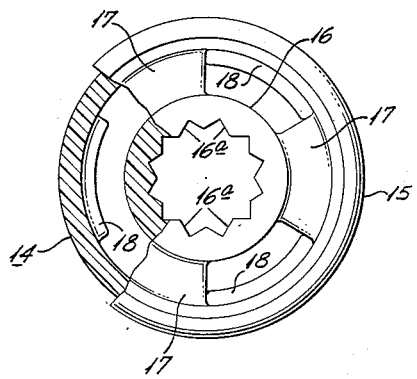
FIG. 2 is a plan view from above of the ferrule and nut pieces removed from the tubular furniture leg with the shank of the supporting member removed.

Referring first to FIG. 1, there will be seen in this particular embodiment a glide 10 for supporting a piece of furniture one of whose round, tapered tubular legs 11 is shown. A shank 12 is provided on the glide not only with the usual helical threading but with vertical splines parallel to the axis. In accordance with the teaching of my prior inventions, the shank is accepted by a nut 13 which is free to rotate relative to a fixed member, generally designated 14. Member 14 supplies ribs matching the splined grooves to prevent rotation of the shank 12. A combination of this type prevents rotation of the shank and, therefore, avoids most of the cause of structures becoming out of adjustment or losing adjustment commonly experienced in prior art.

Figure 5:
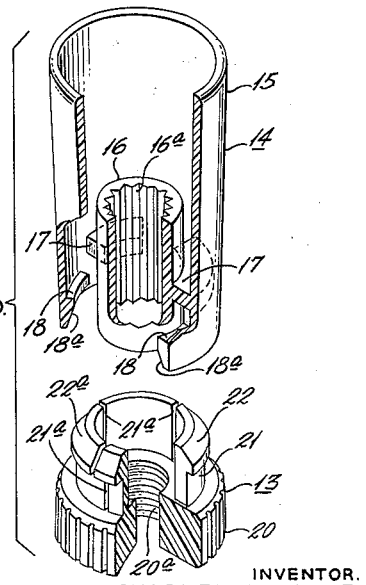
FIG. 5 is an exploded perspective view partially in section showing the individual parts of the structure as they appear when separated or before assembly.

As can be seen in FIGS. 1 and 5, the ferrule 15 is the outer member of piece 14. The ferrule is a tubular member preferably slightly tapered to fit exactly the slightly tapered bottom of tubular leg 11. Actual fit may be a press fit or fit requiring the ferrule to be driven into place. Because the ferrule for the sake of firm support extends onto the bottom of the leg throughout a large part of the ferrule's length, the ribbed structure 16, a tubular member having an outer diameter smaller than the inner diameter of the tubular leg, is located near the bottom of the ferrule. The grooves 16a, which accommodate the splines on the shank of the shaft 12 may be seen best by reference to FIGS. 2 through 5. The tubular member 16 is held in place by radial members in the form of bridging ribs or webs 17 which extend between the tubular member and the ferrule spaced above the bottom of the ferrule and above shoulders 18 at the bottom of the ferrule. Preferably the ribs are 60° segment with 60° gaps between the ribs. As a practical matter, the ferrule which may be made of metal or plastic is normally cast by an integral molding process whereby in one casting the whole piece 14 is obtained. The mold is so shaped that the bottom piece beneath the ribs 17 must be rotated 60° to a point where it can be removed between the successive 60° arcs of the shoulders 18. The shoulders, in turn, are staggered to fall between the ribs 17 which tie the major pieces of the structure together. Since the tubular member 16 is relied upon to prevent rotation of the shank, the webs must have strength primarily in the direction of rotation. However, the weight is borne primarily through the nut 13 as it presses upwardly against the bottom of the ferrule 15.

The nut member 13 consists of a conventional nut 20 of annular form whose inner diameter is threaded and with threads 20a of helical form and of pitch and size to mate with those on shank 12. Integral with the nut 20 and projecting above it is collar 21 which must have an outer diameter smaller than the inner diameter of ferrule 15 and of shoulder 18 as well. At the top of the collar 21 is an outwardly projecting shoulder 22 having an outer diameter greater than the inner diameter of shoulders 18 but smaller than the inner diameter of ferrule 15. The collar is divided into segments by vertical slots 21a which allow the segments to independently spring inwardly and permit its insertion within the end of the ferrule. The material of the collar, and hence preferably the whole nut, is of sufficient resilience to permit the spring-like action. It will be observed that the shoulder 22 has an upper surface 22a which is beveled downwardly and outwardly from a diameter smaller than the inner diameter of shoulder 18 to the outer diameter of the shoulder. Oppositely beveled surfaces 18a are provided on the shoulders 18 to oppose shoulders 22. Surface 18a bears against surface 22a and urges shoulders 22, and specifically the segments of collar 21, inwardly as the nut assembly 13 is pushed upwardly into the bottom of the ferrule assembly 14. Preferably, the bottom of the tubular member 16 has an outer diameter which loosely conforms to the inner diameter of collar 21 with sufficient clearance to permit the action described but otherwise arranced to pilot the nut assembly into proper position. Since the nut has a greater outer diameter than the inner diameter of the ferrule, the weight of the furniture is transferred through the sleeve 15 of the ferrule to the body 20 of the nut and hence through the threads to the shank 12 and to the glide member 10. Preferably, the outer surface of the nut 20 extends slightly beyond the outer diameter of the ferrule and is knurled to permit ease in turning for height adjustment of the furniture support member.

An alternative arrangement employs an extension to the first piece which includes the ferrule. The collar on the nut is of a diameter to surround said extension and provides interengaging shoulders between these members. Referring to FIGS. 6-8, it will be seen that the structure shown is similar to that of FIGS. 1-5 except that it is employed with square tubular member 11' and therefore employs a ferrule 15' which is square in cross section. The tubular member 16' is still circular in section. However, there are four ribs or webs 17' each of which occupies a 45° arc. Four shoulders 18', each occupying a 45° arc, lie intermediate the webs 17' and are preferably located on the flat faces of the tubular member at the point of minimum radius, as best seen in FIG. 8. Since the members all function in essentially the same way and assembly is accomplished in essentially the same manner, corresponding members have been designed with numbers similar to those used in FIGS. 1-5 with the addition of primes thereto.

Referring now to FIG. 9, it will be seen that a floor contacting member or glide 30 is provided to support tubular leg 31 which may be circular or any other desired shape in cross-section and straight or tapered. A threaded and splined shaft 32 enables the glide 30 to be supported in the support structure generally designated 33 which consists of tubular ferrule 34 having an inner surface which snugly engages the outer surface of the tubular leg 31. Within the ferrule is tubular splined member 35 whose inner surface is provided with ribs which engage the vertical splines on shaft 32. The outer diameter tubular member 35 is sufficiently small to be accepted with in the inner diameter of the tubular leg 31. Connecting the tubular member 35 and the ferrule body is a radially extending rib or web member 36. Tubular concentric extensions 37a and 37b extend downward from the rib or web 36, thereby lengthening the overall structure. The outer tubular extension has an outer diameter smaller than ferrule 34 and may be segmented just as collar 21 was segmented by slots 21a in FIG. 5.

A second piece generally designated 38 and consisting of an internally threaded nut 39 for engaging the threads of the shank 32 and a tubular collar 40 is provided to engage the member 33. The collar 40 has an inwardly extending flange 41 which is provided with a radial shoulder 41a which opposes a radial shoulder 42a on the extension 37a. Shoulder 42a is provided by annular groove 42. In this particular embodiment, the bottom edge of the extension 37 is beveled at 37c to urge the tubular member 37a inwardly or extension 40 and specifically the radial flange outwardly as the collar is moved axially over the extension. Once in place, shoulder 37a opposes shoulder 41a and tends to prevent removal of the second piece from the first.

Operation will be obvious. By simply turning the nut 13, 13' or 39, the threads cause the shank to advance. However, the splines prevent turning of the shank at all times so that if the nut is not rotated the shank cannot turn and change the height adjustment.

Several embodiments of the present invention have been illustrated. It will be appreciated by those skilled in the art that many other modifications other than those illustrated will occur. Structural changes can also be made such as the shortening or lengthening of tubular structure 16 on either side of the ribs 17 in the FIGS. 1-5 construction. Other modifications in accordance with the present invention will occur to those skilled in the art. All such modifications are intended to be within the scope and spirit of the present invention.

I claim:

1. A furniture support element for use with a tubular leg adapted to receive an axially splined and threaded shank of a floor contacting member comprising in combination a first piece having a tubular ferrule having an inner surface conforming essentially to the surface of the outer diameter of the furniture leg with which it is to be used, a tube inside and toward the bottom of the ferrule having an outer diameter smaller than the smallest inner dimension of the tubular furniture leg and a ribbed inner surface, the ribs being arranged to engage the splines of the shank, support means connecting the ferrule and the tube, and a second piece having a rotatable internally threaded nut member to engage the threads of the shank, a collar extending above the nut and a radially extending shoulder on the collar spaced above the nut, and a shoulder on the first piece cooperating with the shoulder on the second piece to hold the pieces together once they have engaged, at least one of the shoulders being supported on resilient support means to permit radial yielding of the shoulder so that it may be moved axially past the other shoulder as the first and second pieces are assembled together.

2. The support element of claim 1 in which at least one of the radially extending shoulders is not continuous around its support.

3. The support element of claim 2 in which at least one of the opposed pair of shoulders is beveled in such direction as to facilitate the passing of the shoulders as the first and second pieces are assembled together.

4. A furniture support element for use with a tubular furniture leg adapted to receive the axially splined and threaded shank of a floor contacting member comprising in combination a first piece having a tubular ferrule having an inner surface conforming essentially to the surface of the outer diameter of the furniture leg with which it is to be used, an inwardly extending shoulder at the bottom of the ferrule, a tube inside and toward the bottom of the ferrule having an outer diameter smaller than the inner diameter of the tubular furniture leg with which it is to be used and a ribbed inner surface the ribs being arranged to engage splines on the shank, support means connecting the ferrule and the inside tube spaced above the shoulders on the ferrule and narrower than the length of the tube, and a second piece having a rotatable internally threaded nut member to engage the threads of the shank, a collar extending above the nut of smaller outer diameter than the inner diameter of the shoulder on the ferrule and an outwardly radially extending shoulder at the upper end of the collar, said shoulder having an outer diameter greater than the inner diameter of the shoulder on the ferrule but smaller than the inner diameter of the ferrule whereby the nut may have its collar forced into the bottom of the ferrule so that the shoulder of the nut is caused to overlie the shoulder at the bottom of the ferrule.

5. The furniture support element of claim 4 in which the support ribs connecting the ferrule on the inside tube are arcuate webs spaced 120° apart on their centers.

6. The furniture support element of claim 4 in which the shoulders at the bottom of the ferrule are arcuate elements spaced 120° apart on their centers.

7. The furniture support element of claim 4 in which the ribs between the ferrule and the tubular member are web members spaced apart 120° on their centers and of not more than 60° are in total width and in which the shoulders are staggered with their centers between the centers of the webs of the ribs and are not more than 60° arcuate segments.

8. The furniture support element of claim 4 in which the collar on the nut member is provided with slots parallel to the axis dividing the tubular collar into resilient segments able to spring inwardly.

9. The furniture support element of claim 8 in which the shoulders on the nut are beveled to urge the resilient members inwardly.

10. The furniture support element of claim 4 in which the shoulder on the collar on the nut has an annular beveled surface increasing in diameter from the extreme end where it is smaller than the outer diameter of the shoulder on the ferrule to its maximum diameter and the shoulder on the ferrule has an oppositely beveled shoulder.

11. A furniture support element for use with a tubular furniture leg adapted to receive the axially splined threaded shank of a floor contacting member comprising in combination a first piece consisting of a tubular ferrule having an inner surface conforming essentially to the surface of the outer diameter of the furniture leg with which it is to be used, a tube inside and toward the bottom of the ferrule having an outer diameter smaller than the smallest inner dimension of the tubular furniture leg with which it is to be used and a ribbed inner surface, the ribs being arranged to engage the splines of the shank, support means connecting the ferrule and the tube, an extension means smaller than the other diameter of the ferrule extending from below the ferrule, and a second piece consisting of the rotatably internally threaded nut member to engage the threads of the shank, a collar extending above the nut having an inner diameter larger than the inner diameter of the tubular extension of the ferrule and an outer diameter on the order of the diameter of the ferrule, and a radially extending member on the tubular member and a corresponding radially extending member on the extension to provide overlapping shoulders whereby one member is held in place relative to the other after the extension of the ferrule is forced into the collar on the nut so that the shoulders are caused to pass one another in assembly of the pieces and assume operative position.

12. The furniture support element of claim 11 in which the collar on the nut has an inwardly extending radial flange which is accepted in a radial groove in a downward extension of the ferrule, one of the edges of the flange and one of the side walls of the groove providing the opposed shoulders.

References Cited in the file of this patent
UNITED STATES PATENTS

| | | |
|---|---|---|
| 2,956,368 | Klein | Oct. 18, 1960 |
| 3,025,631 | Reynolds | Mar. 20, 1962 |
| 3,041,777 | Schwartz | July 3, 1962 |